United States Patent

Ban

[15] 3,695,620

[45] Oct. 3, 1972

[54] TAPE DRIVE SPEED CHANGING APPARATUS

[72] Inventor: Itsuki Ban, 829, Higashi-Oizumimachi, Nerima-ku, Tokyo, Japan

[22] Filed: April 14, 1970

[21] Appl. No.: 28,403

[30] Foreign Application Priority Data

Apr. 17, 1969 Japan....................44/34685

[52] U.S. Cl................274/4 D, 74/242.3, 74/242.15, 179/100.2 S, 179/100.2 VC, 226/40, 226/178

[51] Int. Cl...........................................G11b 15/44

[58] Field of Search.........226/40, 41, 178; 74/242.3, 74/242.15; 179/100.2 Z, 100.2 S, 100.2 VC; 274/4 B, 4 D, 11 B, 11 D, 11 E; 64/30 R

[56] References Cited

UNITED STATES PATENTS

| | | | |
|---|---|---|---|
| 2,396,409 | 3/1946 | Berzer | 179/100.2 S |
| 3,248,961 | 5/1966 | Bortzfield | 74/242.3 |
| 2,664,757 | 1/1954 | Shaw | 74/242.15 X |
| 3,563,196 | 2/1971 | Nicolay | 74/242.15 X |
| 2,606,253 | 8/1952 | Somers | 179/100.2 VC |
| 3,287,935 | 11/1966 | Grunbaum | 64/30 |
| 3,237,830 | 3/1966 | Oswald | 226/174 X |
| 2,986,318 | 5/1961 | Tiger | 226/178 |
| 2,289,287 | 7/1942 | Hallinan | 74/242.15 |

*Primary Examiner*—Leonard Forman
*Assistant Examiner*—Dennis A. Dearing
*Attorney*—Jacobs & Jacobs

[57] ABSTRACT

A tape drive speed changing apparatus for a magnetic tape player comprising a motor mounted on a movable support, bias device for biasing the motor in one direction, a small and large drive pulley connected to the output shaft of the motor, a flywheel attached to a capstan for driving a magnetic tape, a belt normally trained between the small drive pulley and the flywheel, shift device for moving the belt to the position where the belt is shifted from the small drive pulley to the large drive pulley, a lock for locking the shift device in the condition in which the belt is trained to the large drive pulley, and a control device controlling operation of the lock whereby the belt is selectively shifted from the small to the large drive pulley or vice versa to drive the magnetic tape at normal playing speed or fast speed.

5 Claims, 6 Drawing Figures

TAPE DRIVE SPEED CHANGING APPARATUS

BACKGROUND OF THE INVENTION

This invention relates to a tape drive speed changing apparatus for a magnetic tape player.

In the magnetic tape player, it has been generally practiced to fast feed the magnetic tape to such a extent that the reproduction with respect to the tape is not required. Where the tape is fast fed, it is customary to increase rotational speed of the capstan for driving the tape in case of players utilizing an endless magnetic tape cartridge. In general, the tape is fed at speed four times as fast as normal playing speed. In order to change rotational speed of the capstan, the output shaft of the motor is provided with two of large and small drive pulleys between which and a flywheel attached to the capstan a belt is shifted from one to the other. This has been considered preferable in economical and mechanical points. However, difficulty has been experienced in employing the way as mentioned above. For instance, the rotational speed of the capstan may be increased twice as fast as before. If the capstan if intended to rotate at speed four times as fast as normal speed, it is required to provide a ratio of the diameter of two large and small drive pulley of 4:1. Accordingly, where the belt is trained between the large drive pulley and the flywheel, the belt is expanded due to more tension as compared with the belt being trained between the small drive pulley and the flywheel. In this instance, the coefficient of expansion of the belt is about 20 percent. A disadvantage to this arrangement is that the deterioration of the belt is more rapid due to its being run while under great tension. From this it is apparent that allowance for increment of tape drive speed may be twice from the durability point of view as to the belt when the belt is shifted. Even if the tape is driven at speed twice as fast as before, it is not satisfactory to practical use.

The inventor has solved these problems and succeeded in obtaining a tape drive speed changing apparatus which is simply arranged so that the tape may be fast fed at speed four times as fast as normal playing speed to increase the rotational speed of the capstan without deterioration of the belt.

SUMMARY OF THE INVENTION

It is a primary object of the invention to provide a tape drive speed changing apparatus for a magnetic tape player, which is capable of changing rotation of a capstan for driving the magnetic tape to two phases, namely, low and high speed to selectively feed the tape low or fast.

Another object of the invention is to provide a tape drive speed changing apparatus for a magnetic tape player, wherein rotation of small and large drive pulleys connected to an output shaft of an electric motor is selectively imparted to the capstan through a flywheel attached to the capstan to selectively rotate the capstan at low or high speed.

Still another object of the invention is to provide a tape drive speed changing apparatus for a magnetic tape player, wherein the motor is swingably provided to change its relative position with respect to the capstan and is swung toward the capstan by the tension of the belt when the belt is shifted from the small drive pulley to the large drive pulley, and is also swung away from the capstan by a spring when the belt is shifted from the large drive pulley to the small drive pulley, the same tension being generated in the belt when the capstan is rotated at either low or high speed, and the belt being prevented from inadvertently expanding when the belt is shifted from the small drive pulley to the large drive pulley. According to the invention, the capstan may be rotated at speed four times as fast as low speed without deterioration of the belt.

A further object of the invention is to provide a tape drive speed changing apparatus for a magnetic tape player, including shift means moving the belt for selectively establishing engagement of the belt over the small drive pulley or the large drive pulley, and lock means for locking the shift means.

Yet another object of the invention is to provide a tape drive speed changing apparatus for a magnetic tape player, wherein the lock means is disengaged from the shift means in response to the pass of the non-recorded zone between one recorded zone and the next recorded zone on the tape through a magnetic head whereby the shift means is returned to the condition in which the belt is shifted to the small drive pulley and the fast feed of the tape is automatically completed in response to the non-recorded zone on the tape to change the tape at normal feed.

As the invention is embodied in the magnetic tape player utilizing the endless magnetic tape cartridge, efficiency of the player may be improved.

These and other objects of the invention will be apparent from the following description and accompanying drawing in which:

DESCRIPTION OF THE PREFERRED EMBODIMENTS

Figure 1:
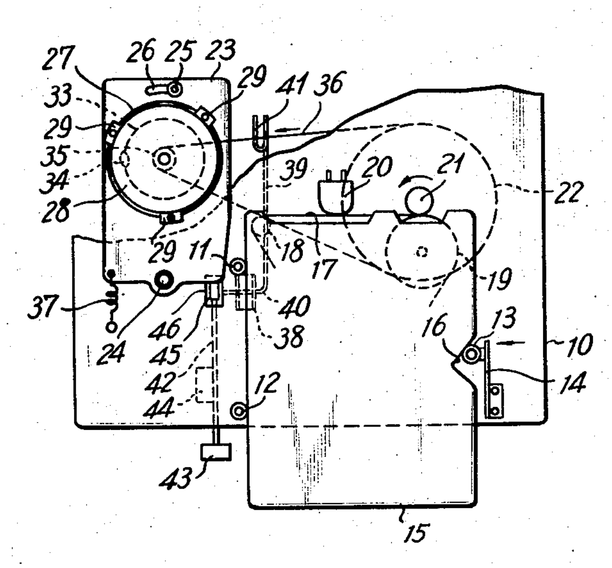
FIG. 1 is a plan view of a magnetic tape player to which one embodiment of the apparatus of the invention is applied.

Referring now to the drawings, and in particularly to FIG. 1, the reference numeral 10 designates a horizontal deck within a housing for an endless magnetic tape cartridge player. A way is provided on the deck 10 for an endless magnetic tape cartridge 15 and guide members 11, 12 and 13 are mounted on the deck to hold the cartridge in the operative position. The guide member 13 is mounted on a leaf spring 14 one end of which is mounted to the deck 10 and is pressed into a notch 16 on the one side of the cartridge 15. When the guide member 13 is caused to press the inclined wall of the notch 16 in the cartridge, the cartridge 15 is exerted by a forward force and then is brought to the operative position with respect to a magnetic head 20 and a capstan 21.

The cartridge 15 includes a generally rectangular housing with a centrally disposed reel (not shown) on which an endless magnetic tape 17 is wound and unwound in conventional manner. The tape 17 passes over a guide 18 and pinch roller 19. The guide 18 and pinch roller 19 are disposed adjacent the leading edge of the cartridge 15 whereat the cartridge side wall is cut away or dispensed with and the tape 17 is extended from the center of the hub of the reel (not shown) about the guide 18 and thence about the pinch roller 19 back to the outer periphery of a roll formed by the tape wound about the hub.

The capstan 21 is rotatably mounted by a suitable bearing (not shown) downwardly of the deck 10 and upwardly extends from the deck through a hole (not shown) bored therethrough. The capstan 21 is adapted to cooperate with the pinch roller 19 of the cartridge 15 when the cartridge is urged into its operating position. The capstan 21 may be driven at either of two different speeds with the apparatus in accordance with this invention. A flywheel 22 is attached to the capstan 21 at the lower end thereof. A support plate 23 rests on the deck 10 to support a capstan driving motor 28 and is swingably supported by a pivot pin 24 mounted to the deck. A pin 25 is fastened to the deck 10 and protrudes through an arc-shaped slot 26 in the support plate 23. A swingable region of the support plate 23 about the pivot pin 24 is limited by the pin 25 and the slot 26. A hole 27 is formed in the support plate 23 to receive the motor 28. The motor 28 is mounted at a portion thereof by fittings 29 to the support plate. The motor mounted to the support plate 23 extends therefrom through an opening (not shown) downwardly of the deck 10. The opening is dimensioned to allow the motor 28 to move in response to swingable movement of the support plate 23. An output shaft 30 for the motor 28 projects from the motor body downwardly of the deck 10 and is provided with a ring 31 attached to the shaft. A coil spring 32 and a large drive pulley 33 are mounted to the output shaft 30. A small drive pulley 35 is also mounted to the output shaft at the lowermost end thereof. The coil spring 32 is interposed between the ring 31 and the large pulley 33 to bias the large pulley 33 so as to abut against the small pulley 35. With this arrangement, the large drive pulley 33 is freely rotated with respect to the output shaft 30, however, normally, the large drive pulley is frictionally connected to the small drive pulley 35 under the bias of the spring 32 and is rotated with the small drive pulley as the output shaft is rotated. The large drive pulley 33 is provided with a flange 34 at the periphery thereof. The diameter of the pulley 33 and 35 are dimensioned to provide speed reduction from the motor output shaft 30 necessary for obtaining the appropriate tape drive speed. A belt 36 is provided between the small drive pulley 35 and the flywheel 22 and the support plate 23 is biased by a spring in the direction where the belt 36 is tensioned. The belt 36 is selectively trained to the small drive pulley 35 or the large drive pulley 33 by means of belt shift means.

Figure 3:
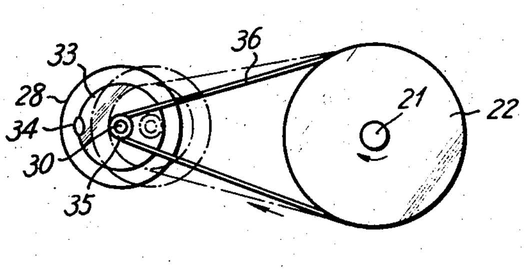
FIG. 3 is a representation of the pulleys and the flywheel as viewed from the bottom of the deck in FIG. 1.
Figure 4:
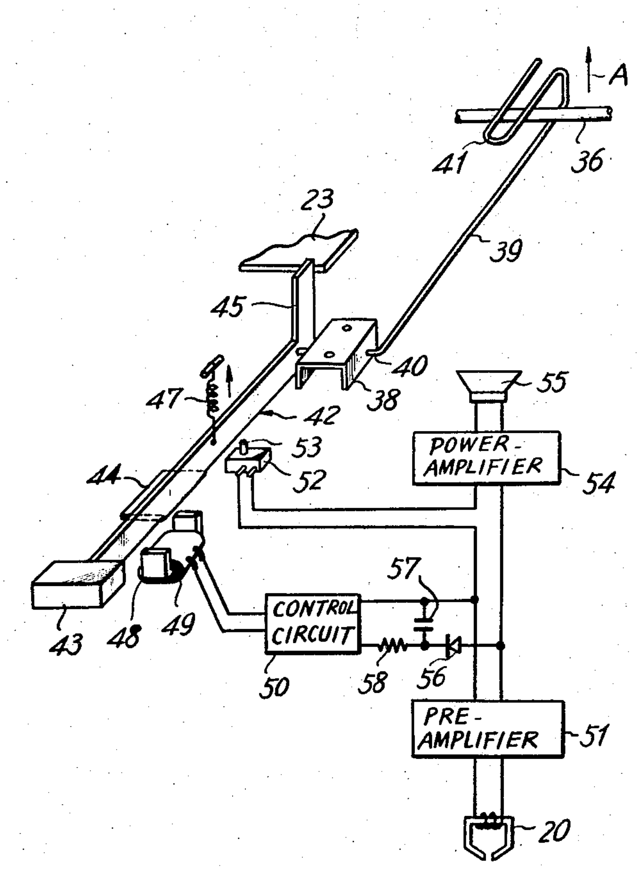
FIG. 4 is a perspective view of means for selectively establishing engagement of the belt shown in FIG. 1 over the two pulleys.

The belt shift means includes an actuating member 39 which is of wire or the like at its one end rotatably supported by a substantially U-shaped bracket 38 mounted to the deck 10 thereunder. The actuating member 39 has one end portion 40 bent at a right angle and supported by the bracket 38 and the other end portion 41 bent to embrace the belt 36. An operating lever 42 has one end having a knob 43, a mid-portion defining bent portion 44, and the other end 45 fixed to the actuating member 39 at the end portion 40. The other end 45 of the lever 42 upwardly extends from the deck 10 through a hole 46 bored therethrough and engages the support plate 23. The operating lever 42 is upwardly biased by a spring 47, but movement of the lever 42 by the spring 47 is limited by the end portion 45 in engagement with the support plate 23. A clockwise rotational force derived from tension of the belt 36 is received by the support plate 23 and is prevented by the end portion 45 of the operating lever 42. At this time, the support plate 23 is counterclockwise biased by the spring 37 and thus maintained in position. As a result, the belt 36 is tensionedly trained between the small drive pulley 35 and the flywheel 22. At this moment, the capstan 21 is rotated at low speed and the tape 17 is run at normal operating speed. The knob 43 projects from the front panel (not shown) of the tape player housing (not shown) and is adapted to be manually operated. The operating lever 42 is made of magnetic materials such as mild steel or the like so that the bent portion 44 is attracted to an electromagnet 48 immovably mounted in the player housing (not shown) when the knob 43 is downwardly pressed by finger to swing the operating lever 42 about the end portion 40 of the actuating member 39 against the bias of the spring 47. Swingable movement of the operating lever 42 is made by manual operation against the bias of the spring 47 to keep the end portion 45 away from the support plate 23 to permit of clockwise rotation of the support plate 23 while the end portion 40 is rotated to move the end portion 41 upwardly as indicated at the arrow A. Thus, the belt 36 is upwardly raised by the member 39 and engages the flange 34 of the large drive pulley 33 thereby being shifted from the small drive pulley 35 to the large drive pulley. At this time, tension of the belt 36 is increased to swing the support plate 23 in the clockwise direction against the bias of the spring 37. More particularly, as shown in FIG. 3 in which the pulleys and the flywheel are viewed from the underside of the deck 10, the motor 28 is moved from the position shown by the solid lines to the position shown by the dot and dash lines while the belt 36 shown by the solid lines trained to the small drive pulley 35 is shifted to the large drive pulley 33 shown by the dot and dash lines. Since the ratio of the diameter for the small and large drive pulleys 35 and 33 is 1:4, the capstan 21 is rotated at speed four times as quick as the normal speed to fast feed the tape 17. At a moment when the flange 34 of the large drive pulley 33 engages the belt 36, the large drive pulley 33 is slipped in relation to the small drive pulley 35 to relieve the impact applied to the belt 36. Without consideration of the impact applied to the belt 36, the large drive pulley 33 may be integrally mounted to the motor output shaft 30 to omit the coil spring 32. Alternatively, the large drive pulley 33 may be connected by a spring (not shown) to the small drive pulley 35 as means for relieving the impact applied to the belt 36. During attraction of the operating lever 42 to the electromagnet 48, the belt 36 is held between the large drive pulley 35 and the flywheel 22 to rotate the capstan 21 at high speed to fast feed the tape 17.

The electromagnet 48 includes a coil 49 connected to an output terminal of a control circuit 50. While the electrical signal is applied to the input terminal, the control circuit 50 allows the input terminal to produce the output voltage and permits the output terminal not to produce the output voltage if there is no electrical signal applied to the input terminal. The control circuit includes, for instance, a switching transistor (not shown) and an electrical source (not shown). More particularly, where the electrical signal is applied to the input terminal of the control circuit 50, the emitter-collector of the switching transistor is energized to allow the voltage of the electrical source to appear in the output terminal. If not, the emitter-collector of the switching transistor is cut off to permit the voltage of the electrical source not to appear in the output terminal. Accordingly, the current drained to the coil 49 of the electromagnet 48 is controlled depending upon existence of the electrical signal applied to the control circuit 50.

The output of the magnetic head 20 adapted to transduce the tape 17 is applied to a pre-amplifier 51. The output of the pre-amplifier 51 is applied through a normally closed electric switch 52 to a power amplifier 54 which drives a speaker 55. The switch 52 is immovably supported in the player housing (not shown). The switch 52 is opened when an actuator 53 is depressedly operated by the lever 42 in attraction of the operating lever 42 to the electromagnet 48. Therefore, the output of the pre-amplifier 51 is not applied to the power amplifier 54 to prevent the speaker 55 from effecting the reproducing sound when the tape 17 is fast fed. The output of the pre-amplifier 51 may also be applied to a rectification circuit comprising a diode 56, a condensor 57 and a resistor 58. The output signal, rectified by the rectification circuit, of the pre-amplifier 51 is applied to the input terminal of the control circuit 50. In other words, the output signal of the rectification circuit is the input signal for the control circuit 50.

Figure 2:
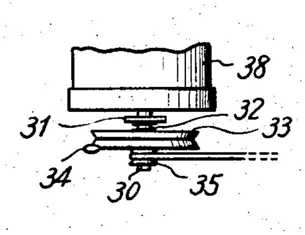
FIG. 2 is a front view showing the motor and pulleys connected to the output of the motor illustrated in FIG. 1 with partially broken away.

As long as the tape 17 is driven and the recorded zone on the tape passes through the magnetic head 20, the rectified reproducing signal is applied to the control circuit 50 whereby the current is drained to the coil 49 of the electromagnet 48 to continuously attract the operating lever 42. On the other hand, the non-recorded zone between one recorded zone and a successive recorded zone on the tape 17 passes through the magnetic head 20 to allow the reproducing signal to decay and the signal applied to the control circuit 50 after time lag determined by the resistor 58 and the condenser 57 has been lost not to produce the output voltage in the output terminal of the control circuit so that the current is not applied to the coil 49 of the electromagnet 48. Consequently, the operating lever 42 is disengaged from the electromagnet 48 and is returned to its original position by the bias of the spring 47. As the lever 42 is returned to its initial position, the actuating member 39 is rotatably returned to its original position to lower the end portion 41 to downwardly move the belt 36. When the belt 36 is shifted downwardly, the belt is trained to the small drive wheel 35 in place of the large drive wheel 33. Simultaneously with engagement of the belt 36 over the small drive wheel 35, the support plate 23 is counterclockwise rotated by the bias of the spring 37 or being depressed by the end portion 45 of the operating lever 42 to return the motor 33 to the position shown by the solid lines of FIG. 2 to thus tension the belt. Engagement of the belt 36 over the small drive wheel 35 to lower rotatable speed of the capstan 21 to terminate the fast feed of the tape 17 thereby driving the tape at normal playing speed. Upon returning the operating lever 42 to its original position, operation of the actuator 53 for the switch 52 is released from the lever to close the switch whereby the tape 17 is driven at normal drive speed and the reproducing sound is produced from the speaker 55.

As fully described hereinbefore, the tape 17 is fast fed by depressedly operating the knob 47, and the tape is then caused to be normally fed in response to the path of the non-recorded zone on the tape through the magnetic head 20. For this reason, where the recorded zone on the tape undesired to be listened, the next or successive recorded zone on the tape may be automatically reproduced at the beginning if the knob 47 is depressedly operated. When the tape 17 is fast fed, the operating lever 42 can be manually raised by the knob 43 against the attraction of the electromagnet 48 to enable the tape to be manually converted from fast to normal feed when desired.

Figure 5:
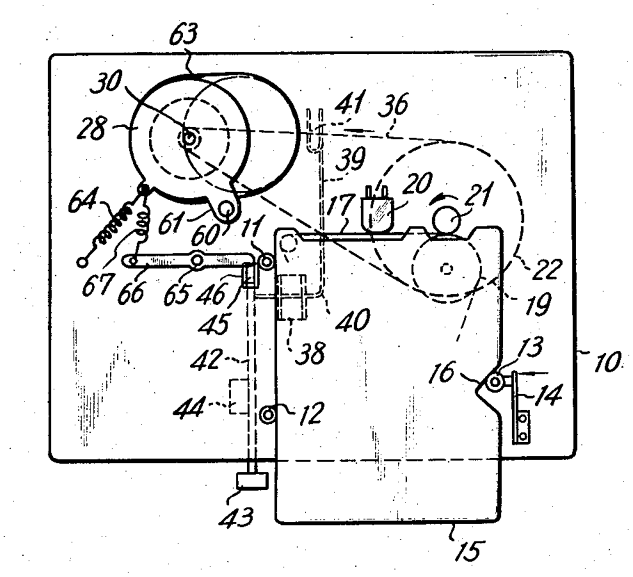
FIG. 5 is a plan view of a magnetic tape player to which another embodiment of the apparatus of the invention.
Figure 6:
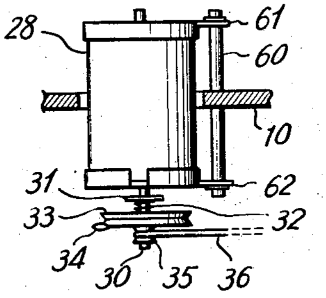
FIG. 6 is a front view showing the motor in FIG. 5 and its vicinity.

FIGS. 5 and 6 shown another embodiment of the apparatus according to the invention, wherein similar numerals are used to illustrate like parts in FIGS. 1 to 4. This embodiment is substantially similar to the embodiment in FIGS. 1 to 4 except for means for supporting the motor 28. More specifically, the motor 28 is swingably supported at its flange portions 61 and 62 for upper and lower caps thereof by a rod 60 which is mounted to the deck 10 perpendicular thereto. A hole 63 is formed in the deck 10 to pass the motor 28 therethrough and to allow the motor to swing within the hole. A spring 64 is intended to bias the motor 28 in the counterclockwise direction, however, movement of the motor made by the spring 64 is limited by the hole 63 at its left end. The motor 28 is connected by a spring 67 to a lever 66 at one end thereof pivoted by a pin 65 to the deck 10. The lever 66 is normally engaged at the other end thereof with the end portion 45 of the operating lever 42.

FIGS. 5 and 6 show a condition where the belt 36 is trained between the small drive pulley 35 and the flywheel 22 and the tape 17 is driven at normal playing speed. Now, when the knob 43 is depressedly operated, the end portion 45 of the operating lever 42 is away from the lever 66 to permit of clockwise rotation of the lever 66 and the elastic force of the spring 67 decays so that the motor 28 is counterclockwise biased only the bias of the spring 64. Accordingly, in response to operatively depression of the knob 43, the belt 36 is upwardly shifted by the actuating member 39 from the small drive pulley 35 to the large drive pulley 33 and at the same time the motor 28 is swung by tension of the belt 36 from the position shown by the solid lines to the position shown by the dot and dash lines against the bias of the spring 64. In this manner, rotational speed of the capstan 21 is increased to fast feed the tape 17. For the period when the operating lever 42 is locked by lock means similar to the electromagnet 48 shown in FIG. 4, the tape 17 continues its fast feed. Upon disengagement of the operating lever 42 from the lock means, the operating lever 42 is returned to its original position and the belt 36 is shifted from the large drive pulley 33 to the small drive pulley 35 and at the same time the motor 28 is returned from the position shown by the dot and dash lines to the position shown by the solid lines by the bias of the spring 64 and the bias of the spring 67 derived from counterclockwise swing of the lever 66 because of depression by the end portion 45 thereby rotating the capstan 21 at low speed.

The lever 66 and the spring 67 are not always indispensable but available for securing position of the motor 28 for the period when the tape 17 is driven at normal speed.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. A tape drive speed changing apparatus for a magnetic tape player having a tape reproducing circuit including a player deck and a magnetic head, and a tape drive device for driving a tape comprising: a motor on said player deck as drive source for said tape drive device, said motor being mounted for movement with respect to said player deck; a large and a small drive pulley arranged adjacent to each other and connected coaxially to the output shaft of said motor, said large drive pulley having a flange at the periphery thereof; a rotatable capstan in said tape drive device longitudinally parallel to the output shaft of said motor, said capstan having a flywheel attached thereto; a belt normally trained between said small drive pulley and said flywheel to impart rotation of said output shaft of said motor to said capstan, said capstan being rotated at low speed and said magnetic tape being driven at normal playing speed when said belt is trained between said small drive pulley and said flywheel; bias means for biasing said motor in the direction where said belt is tensioned, said tension of said belt being maintained by said bias means; shift means for moving said belt from said small drive pulley to said large drive pulley and vice versa, said shift means comprising an operating lever and an actuating member coupled to said operating lever, said actuating member and said operating lever being mounted on said player deck for pivotal movement about one point, a spring biasing said operating lever to a first position, said operating lever being operable to be manually moved against the bias of said spring to a second position, said actuating member being operable to move said belt to engage said flange of said large drive pulley and thus shift the belt from said small drive pulley to said large drive pulley when said operating lever is moved from the first position to the second position, said capstan being rotated at high speed to fast feed said magnetic tape when said belt is trained between said large drive pulley and said flywheel, said motor being moved by the tension of said belt against said bias means when said belt is engaged over said large drive pulley; lock means for locking said shift means in the condition in which said operating lever is in said second position and said belt is engaged over said large drive pulley, said magnetic tape being run at fast feed while said lock means locks said shift means, control means for unlocking said lock means, said shift means being operable to return said operating lever to its first position and to shift said belt from said large drive pulley to said small drive pulley upon the unlocking of said lock means, and means mounted on said player deck cooperating with an end portion of the operating lever for arresting movement of said motor derived from the tension of said belt trained between said small drive pulley and said flywheel when said shift means is disengaged from said lock means.

2. A tape drive speed changing apparatus for a magnetic tape player in accordance with claim 1, wherein said lock means is an electromagnet means for magnetically attracting and locking said operating lever in said second position.

3. A tape drive speed changing apparatus for a magnetic tape player in accordance with claim 2, wherein said control means includes a control circuit for energizing said electromagnet means in response to a reproducing signal of said reproducing circuit generated when a recorded zone on said magnetic tape passes through said magnetic head, and for deenergizing said electromagnet means in response to the absence of the reproducing signal of said reproducing circuit when a non-recorded zone on said magnetic tape passes through said magnetic head.

4. A tape drive speed changing apparatus for a magnetic tape player in accordance with claim 1, wherein said large drive pulley is rotatably connected to the output shaft of said motor and further frictionally coupled to said small drive pulley fixed to the output shaft by the bias of a coil spring provided to the output shaft.

5. A tape drive speed changing apparatus for a magnetic tape player in accordance with claim 1, wherein said motor extends through a hole formed in said player deck upwardly and downwardly of said deck, the movable region of said motor being limited by said hole.

* * * * *